March 26, 1940.  N. P. LARSEN  2,194,506
VEHICLE CONSTRUCTION
Filed March 30, 1938

INVENTOR.
NEIL P. LARSEN
BY Bates, Golrick, & Teare
ATTORNEYS

Patented Mar. 26, 1940

2,194,506

UNITED STATES PATENT OFFICE 2,194,506

VEHICLE CONSTRUCTION

Neil P. Larsen, Cleveland, Ohio, assignor to American Coach & Body Company, Cleveland, Ohio, a corporation of Ohio Application March 30, 1938, Serial No. 198,920

2 Claims. (Cl. 296—24)

This invention relates to motor vehicles and particularly to the body construction of those that are used for public utility purposes. Vehicles of this nature usually have an enclosed drivers' cab and a storage compartment in back of the cab. The storage compartment has side walls and a roof but the rear end is open to facilitate the entrance and removal of equipment.

Heretofore, storage compartments terminated close to the ends of the side walls and as a result, the workmen have been endangered whenever heavy equipment, such for example, as a reel of cable or a transformer is being loaded onto or is being removed from the storage compartment. This danger has been caused by the fact that the workmen who are on the vehicle and assisting in guiding the load are forced to stand between the moving article and the inner side wall of the body and are frequently injured as a result of insufficient clearance between the articles and the walls of the body. Consideration has been given to the idea of enlarging the size of the body but traffic conditions do not permit enlargement in width over that employed at present.

An object of my invention is to so construct a public utility vehicle that additional space may be provided for the workmen who are required to be on the vehicle during a loading or unloading operation without enlarging the side wall construction thereof. Additionally an object of the invention is to obtain this additional working space without requiring an increase in the wheel base of the vehicle and therefore without enlarging the turning radius of it.

Figure 2:
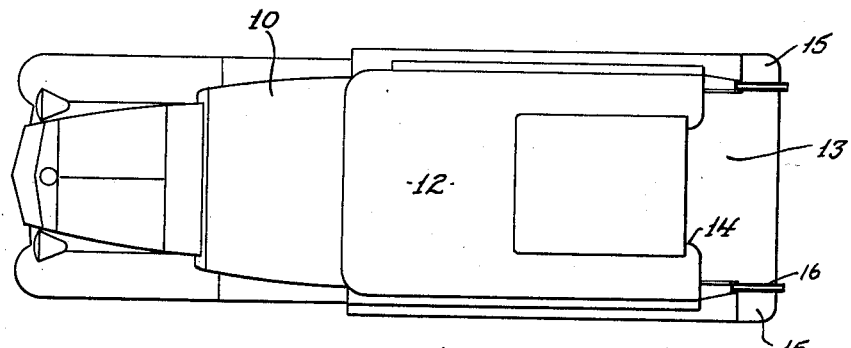
Figure 1:
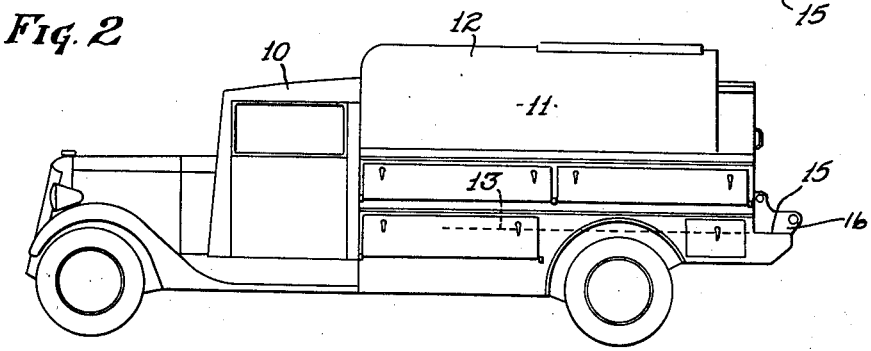
Figure 3:
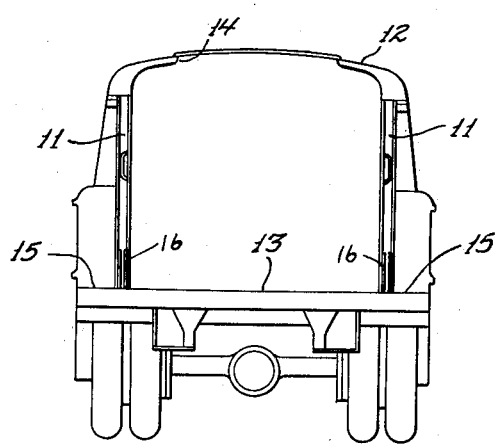

Referring now to the drawings, Fig. 1 is a side elevation of a vehicle embodying my improved construction; Fig. 2 is a top plan of the vehicle and Fig. 3 is an end view of the vehicle.

The vehicle illustrated has a driver's cab 10 which is located forwardly of a storage compartment that has the usual side walls 11, roof 12 and floor 13. The roof is shown as having an opening 14 therein through which the derrick poles may project in the usual way. Heretofore, the end of the floor of the storage compartment has been so close to the rear end of the side walls that workmen assisting in the loading and unloading operation have been compelled to stand within the space between the load and the side walls of the storage compartment walls.

My invention however eliminates this difficulty by extending the floor level in the form of a platform sufficiently far beyond the end of the side walls as at 15, to provide adequate space upon which the workmen may stand either on one or both sides of the load that is being handled, and outside the confines of the body walls. Thus as will be seen in Figs. 2 and 3, the platform not only extends rearwardly of the plane passing through the rear of the body walls, but also laterally terminating close to the planes of the surfaces of the side walls. Thus, where the side walls embody tool compartments, there is ample space for a safe footing without projecting the platform beyond the confines of the outer walls. This minimizes the difficulty which a driver may experience in operating the vehicle along a crowded thoroughfare.

The platform extension may be made as an integral continuation of the floor structure or if desired, it may be added onto the present construction as a separate unit. I have shown it however in the drawing, as comprising an integral part of the floor construction.

An advantage of the invention is that one or more workmen may stand alongside the load and assist in guiding it onto or off the vehicle without endangering themselves as a result of any sudden lateral movement of it. This is accomplished by the provision of a set of plates 16 extending rearwardly of the side walls of the vehicle and projecting upon the platform 15, to thereby prevent the load from slipping upon that portion of the platform where a workman is standing. The plates 16 may also be designed to be adaptable to receive various attachments which are portable with the utility truck.

I claim:

1. A vehicle body for public utility use having a floor and side walls, and a compartment on the outer side of a side wall, the rear of the body being open for transferring articles to and from the vehicle said vehicle having a platform on a level with the floor and extending rearwardly of the side walls and laterally behind the compartment, the platform extension having its outer edge disposed within the confines of the outer wall of the compartment the platform being sufficient in size to support a workman in standing position outside the inner confines of the side wall.

2. A vehicle body construction for public utility use having a floor, a roof and side walls with outwardly opening compartments on their outer sides, the rear of the body being open for transferring articles to and from the vehicle a platform on a level with the floor and projecting rearwardly of the side walls and laterally across the compartments, the platform having the outer edges of the projecting portions lying substantially within the confines of the outside limits of the compartments and having an area sufficient in size to permit a workman to stand thereon on either side of the vehicle, and plates for the side walls projecting rearwardly upon the platform and providing toe guards to prevent injury to a workman while assisting in loading or unloading the vehicle.

NEIL P. LARSEN.